Jan. 10, 1967   P. FEDDISH   3,296,702

FRAMING SQUARE GAUGE

Filed March 24, 1965

INVENTOR
PETER FEDDISH
BY
Meyer, Baldwin, Doran & Egan
ATTORNEYS 3,296,702
FRAMING SQUARE GAUGE
Peter Feddish, 25511 Chardon Road,
Richmond Heights, Ohio 44124
Filed Mar. 24, 1965, Ser. No. 442,439
2 Claims. (Cl. 33—95)

This invention refers to carpenters' squares, and particularly to a gauge for attaching to and using in co-operation with a framing square.

An object of this invetnion is to provide an attachment means for a carpenter's framing square whereby the square can be used to repeatedly cut a number of boards to the same length with a power saw without individually marking each piece.

Still another object is to provide such an attachment means for a framing square comprising an adjustable gauge which is extendible beyond the length of one arm of the square whereby it allows like, repeated cutting of boards having a length in excess of the length of said one arm.

Yet another object is to provide a conventional carpenter's framing square having gauge means as set forth above attached thereto, the means of attachment obviating any change in the square.

A further object is to provide a framing square as set forth above wherein the gauge means can be telescoped to an out-of-the-way position or readily detached from the square altogether, if so desired.

Other objects of the invention and the invention itself will be readily understood from the following description of one embodiment of the invention as illustrated in the accompanying drawings.

Figure 1:
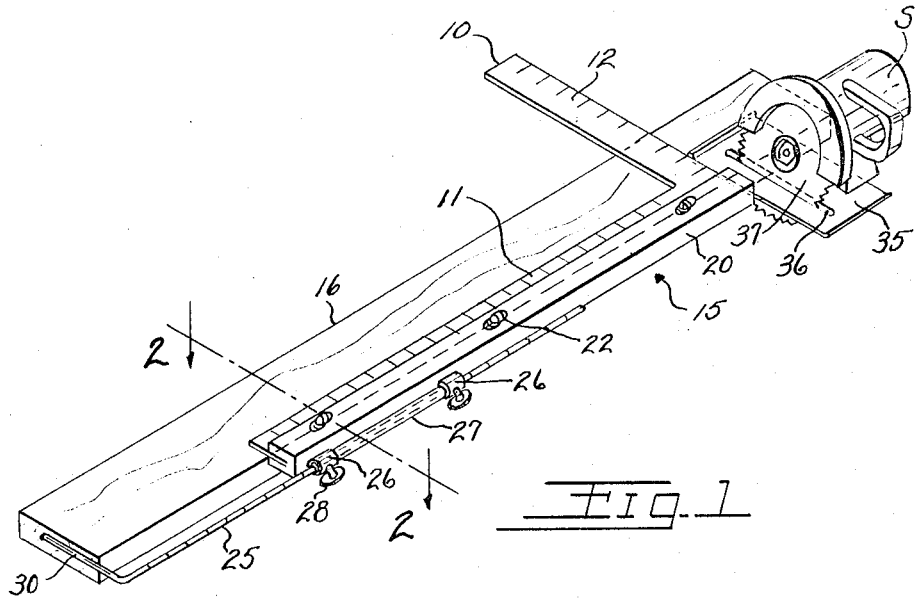

FIG. 1 of the drawings shows a perspective view of a framing square, with the framing square gauge of this invention attached thereto, in association with a board or other workpiece.

Figure 2:
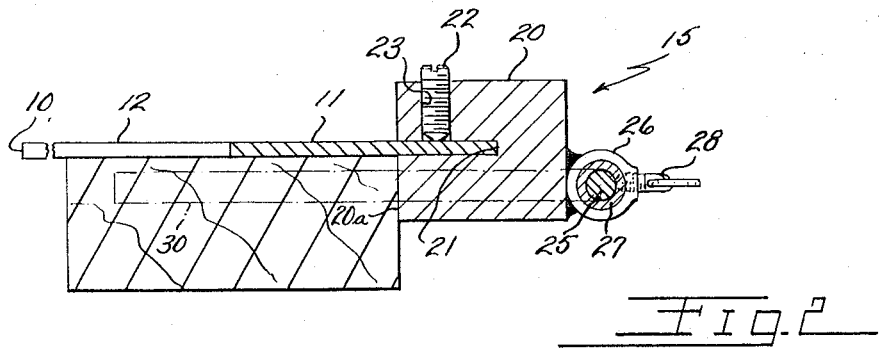

FIG. 2 is an enlarged cross-section taken along the line 2—2 of FIG. 1.

Referring now to the drawings, at 10 there is provided a framing square of conventional form made of heavy plate metal and having a longer bladelike measuring arm 11 and a relatively right angularly disposed, shorter bladelike measuring arm 12. A gauge assembly, generally indicated at 15, is attached to the outer edge of the longer measuring arm 11. The framing square 10 is shown lying flatwise upon a piece of lumber such as a board 16 with the gauge assembly 15 projecting laterally beyond one side edge of said board and with the shorter measuring arm 12 being disposed transversely across said board.

The gauge assembly 15 comprises a mounting member 20 which, as well shown in FIG. 2, is a relatively thick, elongated bar of metal having a rectangular cross-section providing parallel top and bottom faces and parallel elongated side faces. The mounting member 20 may be made of any suitable rigid material, aluminum being preferred because it is both rigid and lightweight. Said mounting member is longitudinally slotted or grooved to provide a channel or slot 21 in one side face 20a thereof parallel to and intermediate the top and bottom faces of a width for receiving snugly the outer edge portion of the longer measuring arm 11 of the framing square 10. The arm 11 when bottomed in slot 21 extends over the upper face of the board to be cut when the inner side face of bar 20 is against the edge of the board as in FIG. 1. As well shown in FIG. 2, the edge of the arm 11 seats snugly within the channel 21, and a plurality of right angularly directed set screws 22 are provided in threaded apertures 23 for securing said measuring arm within said channel at a plurality of points along the mounting member 20.

Means are provided on the side of the mounting member 20 opposite the channel 21 for mounting a longitudinally extendible gauge rod 25. Such means comprise a pair of substantially cylindrical brackets 26 which are coaxially positioned in spaced relationship along the mounting member 20 with the axis thereof being disposed parallel with said mounting member. Said brackets 26 are welded or otherwise suitably attached to the mounting member 20, generally below the level of the channel 21. Said brackets carry the ends of a tubular guide sleeve 27 within which the linear main section of gauge rod 25 is slidably mounted. Wing bolts 28 are thread fitted through the brackets 26 and the guide sleeve 27 for retaining the gauge rod 25 in any longitudinally adjusted position with respect to the mounting member 20. The end of the gauge rod 25 which projects beyond or toward the distal end of the longer measuring arm 11 is provided with a right angularly bent stop portion 30 of a length to abut the end of board 16 as shown in FIG. 1. The main section of gauge rod 25 may be rotated about its longitudinal axis to engage stop portion 30 with a warped board.

The manner of use of the framing square gauge of this invention will be readily understood from the foregoing detailed description and reference to FIG. 1. The bottom of the channel 21 is carefully formed to be absolutely parallel with the face 20a which is disposed on either side of said channel. The result is that when the measuring arm 11 is seated firmly against the bottom of the channel 21, the face 20a is disposed at right angles to the shorter measuring arm 12. Therefore, when the measuring arm 11 is placed flatwise upon the board 16 with the portion of the face 20a which is disposed below said measuring arm held firmly against the lateral edge of said board, the shorter measuring arm 12 is disposed perpendicular to the longer dimension of the board and lies transversely across the upper surface thereof. When it is desired to cut a number of boards all to the same length, the gauge rod 25 is extended out of the guide sleeve 27 the desired distance, and said rod is then secured in its adjusted position by the wing bolts 28. Thereafter, any number of boards may be cut to the same length by positioning the framing square 10 on the board as described above and moving it longitudinally along the board until the stop portion 30 abuts the end of said board. With the framing square in this position, the board may be immediately sawed by a power saw S as shown in FIG. 1. Said power saw is conventional in construction having a guide plate 35 which is slotted at 36 to receive a circular saw blade 37. The edge of the guide plate 35 is held against and moved along the outer edge of the shorter measuring arm 12 as the blade 37 makes the cut.

The gauge rod 25 may be provided with measuring indicia or marks as indicated at 25a whereby measurement of the initial board may be made directly with the gauge itself provided the distance between the edge of the guide plate 35 and the saw blade 37 is subtracted. In such case, the indicia 25a would be used with reference to the distal end of the longer measuring arm 11, an end of one of the brackets 26, or an arbitrarily placed mark carried by the mounting member 20.

If it is desired to use the framing square 10 without completely detaching the gauge assembly 15, the gauge rod 25 may be pivoted away from the board 16 after loosening the wing nuts 28, and it may be telescoped to a position directly opposite the mounting member 20 whereby it does not project beyond the distal end of the measuring arm 11. Subsequent tightening of the wing bolts 28 will hold the gauge rod in such out-of-the-way position. If desired, the entire gauge assembly 15 may be slipped off of the measuring arm 11 by merely loosening the set screws 22 whereby the framing square 10 may be used in a conventional manner, there being no modification thereof. It will be readily understood that the gauge assembly 15, or a shortened version thereof, may be attached to the shorter measuring arm 12 if so desired and used in the same manner as herein described above.

It will be understood that many changes in the details of the invention as herein described and illustrated may be made without, however, departing from the spirit thereof or the scope of the appended claims.

What is claimed is:

1. A framing square gauge device for use with a carpenter's framing square having right angularly disposed measuring arms of flat, bladelike form for squaring and sawing a multiple number of boards of uniform length; said gauge device comprising an elongated linear bar of generally rectangular cross section having elongated parallel side faces and parallel top and bottom faces, there being an elongated linear slot in one of said side faces parallel to and intermediate said top and bottom faces, said slot being of a width to snugly receive the thickness dimension of an arm of a framing square and being of a depth less than the width dimension of said arm, whereby a framing square arm bottomed in said slot will extend over the upper surface of a board to be cut with the other arm of said square extending across said board when said one side face of said bar below said slot abuts a side edge of said board, quickly adjustable means on said bar for fixing an arm of a framing square in said slot; a gauge rod having a linear main section; means on said bar for mounting said rod main section thereto for adjustable movement longitudinally of said main section, quickly adjustable means on said bar for fixing said rod in longitudinally adjusted position relative to said bar with said rod main section extending beyond the end of said bar opposite the other arm of said square, and said rod main section having at its free end an angularly disposed stop section of a length to abut the end of a board in position for squaring and sawing by said gauge device.

2. A framing square gauge device as defined in claim 1, wherein said rod main section and its mounting means provide rotation of said main section about its longitudinal axis.

References Cited by the Examiner

UNITED STATES PATENTS

| | | | |
|---|---|---|---|
| 752,823 | 2/1904 | Cary | 33—95 |
| 1,014,453 | 1/1912 | Clark et al. | 33—173 X |
| 1,223,132 | 4/1917 | Zigler et al. | 33—143 |
| 2,772,707 | 12/1956 | Leino | 33—112 X |
| 3,154,859 | 11/1964 | Grabowski | 33—161 X |

FOREIGN PATENTS

| | | |
|---|---|---|
| 478,074 | 10/1951 | Canada. |

LEONARD FORMAN, *Primary Examiner.*

H. N. HAROIAN, *Assistant Examiner.*